United States Patent
Braunheim

(10) Patent No.: US 9,320,992 B2
(45) Date of Patent: Apr. 26, 2016

(54) FILTER APPLIANCE

(75) Inventor: Michael Braunheim, Goeppingen (DE)

(73) Assignee: Mahle International GmbH (DE)

( * ) Notice: Subject to any disclaimer, the term of this patent is extended or adjusted under 35 U.S.C. 154(b) by 723 days.

(21) Appl. No.: 13/634,456

(22) PCT Filed: Mar. 8, 2011

(86) PCT No.: PCT/EP2011/053449
§ 371 (c)(1),
(2), (4) Date: Nov. 26, 2012

(87) PCT Pub. No.: WO2011/113723
PCT Pub. Date: Sep. 22, 2011

(65) Prior Publication Data
US 2013/0062270 A1 Mar. 14, 2013

(30) Foreign Application Priority Data
Mar. 13, 2010 (DE) .................. 10 2010 011 290

(51) Int. Cl.
*B01D 29/11* (2006.01)
*B01D 35/00* (2006.01)
(Continued)

(52) U.S. Cl.
CPC ............ *B01D 35/153* (2013.01); *B01D 29/112* (2013.01); *B01D 35/306* (2013.01);
(Continued)

(58) Field of Classification Search
CPC .... B01D 35/153; B01D 35/16; B01D 35/301; B01D 35/303; B01D 35/306; B01D 36/00; B01D 36/001; B01D 36/003; B01D 36/04; B01D 36/008; B01D 2201/0415; B01D 2201/219; B01D 2201/305; B01D 2201/316; B01D 2201/40; B01D 2201/4046; B01D 2201/4053; B01D 29/00; B01D 29/0029; B01D 29/0043; B01D 29/0045; B01D 29/0054; B01D 29/0011; B01D 29/11; B01D 29/112; B01D 2201/291
USPC ......... 210/232, 236, 295, 299, 303, 345–347, 210/435, 451, 455, 488, 497.01
See application file for complete search history.

(56) References Cited

U.S. PATENT DOCUMENTS 4,371,439 A * 2/1983 Thornton ...................... 210/232
5,837,137 A * 11/1998 Janik ............................ 210/232
(Continued)

FOREIGN PATENT DOCUMENTS

DE 102007038018 A1 4/2008
DE 102007009352 A1 8/2008
(Continued)

OTHER PUBLICATIONS

English abstract for EP-1233173.
(Continued)

*Primary Examiner* — Joseph Drodge
(74) *Attorney, Agent, or Firm* — Fishman Stewart PLLC

(57) ABSTRACT

A filter appliance may include a ring filter element arranged upright in a filter having an upper end disc and a lower end disc. A component may be arranged on the lower end disc and may include at least one of a water collection pot, a projecting nipple-shaped pin and at least one key profile. A function element may be configured to be inserted in a filter housing pot of the filter appliance, the function element including a channel configured to receive the component. A lock profile may be provided on the function element, wherein the lock profile corresponds to the at least one key profile of the lower disk. The filter appliance is may be operational provided the pin engages the channel and the key profile engages in the lock profile.

20 Claims, 2 Drawing Sheets

(51) Int. Cl.
*B01D 35/30* (2006.01)
*B01D 35/153* (2006.01)
*B01D 36/00* (2006.01)

(52) U.S. Cl.
CPC ...... *B01D36/001* (2013.01); *B01D 2201/0415* (2013.01); *B01D 2201/291* (2013.01); *B01D 2201/305* (2013.01); *B01D 2201/316* (2013.01); *B01D 2201/4046* (2013.01); *B01D 2201/4053* (2013.01)

(56) References Cited

U.S. PATENT DOCUMENTS

| | | | |
|---|---|---|---|
| 6,495,042 B1 * | 12/2002 | Knight | 210/497.01 |
| 7,070,692 B2 * | 7/2006 | Knight | 210/497.01 |
| 2004/0163371 A1 | 8/2004 | Reid | |
| 2005/0161386 A1 | 7/2005 | Gustafson et al. | |
| 2006/0054547 A1 | 3/2006 | Richmond et al. | |
| 2008/0202081 A1 | 8/2008 | Schmid et al. | |
| 2008/0245719 A1 * | 10/2008 | Beard et al. | 210/235 |
| 2009/0230048 A1 * | 9/2009 | Braunheim | B01D 35/153 210/236 |
| 2009/0242470 A1 * | 10/2009 | Muenkel et al. | 210/148 |
| 2010/0025317 A1 | 2/2010 | Fall et al. | |
| 2010/0155318 A1 * | 6/2010 | Lika | 210/185 |
| 2011/0017650 A1 | 1/2011 | Grass et al. | |
| 2011/0174712 A1 | 7/2011 | Huber | |

FOREIGN PATENT DOCUMENTS

| | | |
|---|---|---|
| DE | 102007062100 A1 | 6/2009 |
| DE | 102008040319 A1 | 1/2010 |
| EP | 1233173 A2 | 8/2002 |
| WO | WO-2007/148862 A1 | 12/2007 |

OTHER PUBLICATIONS

English abstract for DE-102007038018.

* cited by examiner

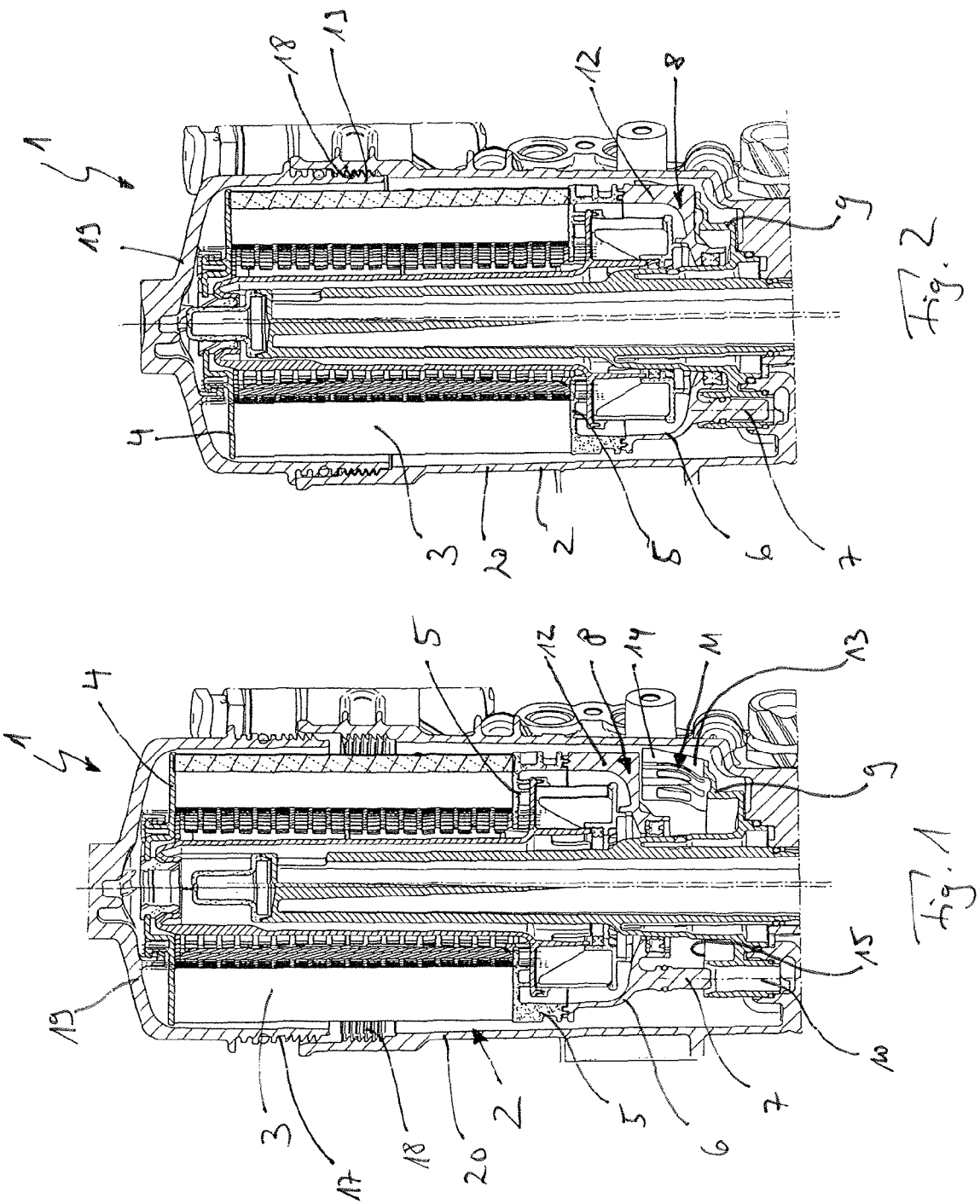

FILTER APPLIANCE

CROSS-REFERENCE TO RELATED APPLICATIONS

This application is a National Stage application which claims the benefit of International Application No. PCT/EP2011/053449 filed Mar. 8, 2011, which claims priority based on German Patent Application No. 102010011290.9, filed Mar. 13, 2010, both of which are hereby incorporated by reference in their entirety.

TECHNICAL FIELD

The present invention relates to a filter appliance with a ring filter element arranged in filter housing, which comprise an upper end disc and a lower end disc, according to the preamble of claim 1. The invention additionally relates to a modular system for such a filter appliance and a ring filter element for such a filter appliance.

BACKGROUND

A generic filter appliance is thoroughly known and can be found in almost all modern motor vehicles, employed for example as oil or fuel filter.

In order to be able to guarantee a perfect filtering effect it is often important to the manufacturer of such filter appliances that only filter elements authorised or produced by themselves are employed. For when filter elements of foreign makes or imitations are employed, not only the filtering performance can be impaired but damages can be caused at the same time. On the other side it is desirable to be able to produce and offer filter elements for such filter appliances as cost-effectively as possible.

SUMMARY

The present invention therefore deals with the problem of stating an improved or at least an alternative embodiment for a filter appliance for the generic type, which makes possible in particular exclusively the use of authorised filter elements.

According to the invention, this problem is solved through the subjects of the independent claims. Advantageous embodiments are subject of the dependent claims.

The present invention is based on the general idea of providing a ring filter element known per se, which is arranged upright in a filter housing of a filter appliance, on the bottom side with a projecting nipple-shaped pin and at least with one key profile. The pin and the key profile in this case can be directly arranged on the lower end disc or on a component arranged thereon, such as for example a water collection pot. On an associated function element, often also called function carrier, which in the installation state is arranged in the filter housing of the filter appliance, a channel that is formed complementarily to the pin and a lock profile belonging to the at least one key profile are arranged. A perfect operating mode of the filter appliance according to the invention is exclusively possible provided the ring filter element in its state installed in the filter appliance engages with the pin in the channel and by means of the key profile in the associated lock profile. This makes possible to equip the filter appliance for different markets with in each case associated function elements and ring filter elements matched to these, so that in the respective market merely predetermined filter elements can be inserted in a fitting manner in the filter appliances present in the respective market. Ring filter elements from other markets, which then have a deviating key profile, cannot be fittingly inserted in the filter appliance, so that an operation of the filter appliance is exclusively possible with ring filter elements intended for this purpose, as a result of which in particular high quality standards can be guaranteed and maintained. In particular, the use of ring filter elements that can possibly impair the filtering performance of the filter appliance can be reliably prevented because of this.

With an advantageous further development of the solution according to the invention the key profile is formed through two or more noses spaced from one another in circumferential direction, while the associated lock profile is formed by two or more slits formed complementarily thereto, wherein the slits are closed by means of breakable blocking elements and can be matched to a respective key profile through an expert braking of corresponding blocking element prior to the actual assembly. In general it is also conceivable to produce the lock profile as lock element independently of the function element in order to then have the possibility during the assembly of interconnecting the channel, i.e. the pin mounting, in the function element and the lock element in different positions so that the desired lock profile is created. Because of this it is possible to form the function element for all key-lock versions as identical part, wherein for matching the lock profile to the ring filter elements used in the respective market, the corresponding blocking elements have to be broken out or off to release the associated slits. The formation of the function element as identical part makes possible a particularly cost-effective manufacture of said function element, for example as injection moulded part, wherein the matching of the lock profile to the respective key profile of the ring filter element used is easily possible.

With an advantageous further development of the solution according to the invention, a water separator arranged within the water collection pot is formed as coalescer and simultaneously welded to the lower end disc of the ring filter element. Such a coalescer is able to collect and discharge water particles and thus for example filter out water components present in the fuel, so that these cannot enter the combustion engine and cause corrosion damages there. The filter appliance in this case can for example be designed as oil or fuel filter, wherein entirely in general an embodiment as air filter is also conceivable. The water separator in the case of a fuel filter is attached to the lower end disc of the ring filter element, in particular welded, and because of this can be exactly positioned and fixed before the assembly or before the closing of the water collection pot, which significantly simplifies the manufacturing process of the filter appliance according to the invention.

With a further advantageous embodiment of the solution according to the invention, a guide is provided on the filter housing pot or on a function element arranged therein, along which the pin during the assembly of the ring filter element is guided to the channel. Such a guide can for example be formed in the manner of a ramp, which makes possible any insertion of the ring filter element so that the latter slides along the guide into the channel by means of the pin and because of this an always correct assembly can be ensured. On the one hand, such a guide can be realised cost-effectively, for example through a suitable injection mould and on the other hand guarantees a clearly simplified handling of the filter appliance according to the invention, since the ring filter element can be inserted in the filter housing tops in any rotary angle position and can be transferred into its right and correct position by simply twisting. An incorrect assembly of the ring filter element can be reliably excluded because of this.

Further important features and advantages of the invention are obtained from the subclaims, from the drawings and from the associated figure description by means of the drawings.

It is to be understood that the features mentioned above and still to be explained in the following cannot only be used in the respective combination stated but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters relate to same or similar or functionally same components.

Here it shows, in each case schematically,

FIG. 1 a filter appliance according to the invention during the assembly of a ring filter element, FIG. 2 a representation as in FIG. 1, however in an operating state of the filter appliance, FIG. 3 a ring filter element according to the invention, FIG. 4 different views of a function element according to the invention.

DETAILED DESCRIPTION

Figure 3:
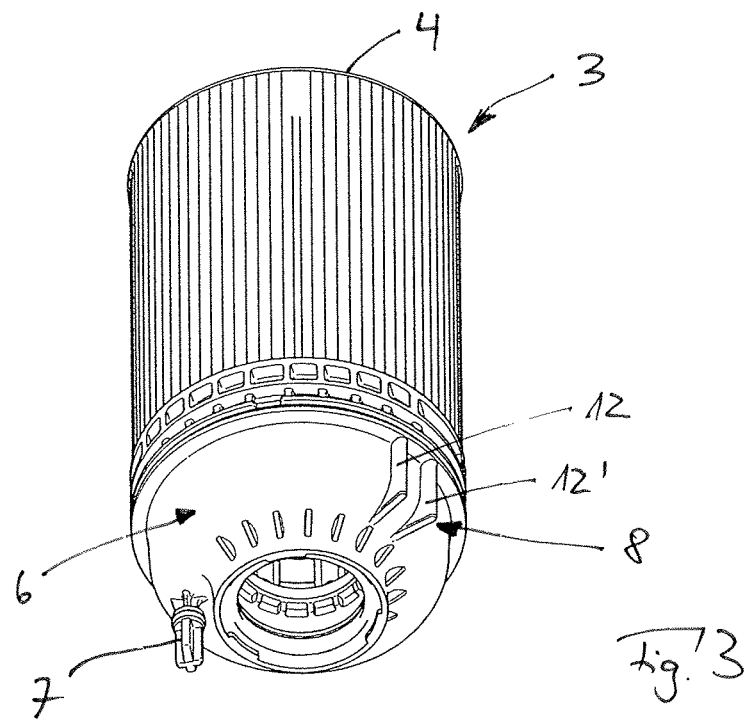

Corresponding to FIGS. 1 and 2, a filter appliance 1 according to the invention, which for example can be embodied as an oil or fuel filter, comprises a ring filter element 3 that is arranged in a filter housing 2 in an upright manner. The ring filter element 3, in this case, in the known manner, comprises an upper end disc 4 and a lower end disc 5, wherein on the lower end disc 5 a water collection pot 6 (see FIG. 3) is provided. Here, the water collection pot is arranged purely optionally, so that a projecting nipple-shaped pin 7 and at least one key profile 8 can be arranged either directly on the lower end disc 5 or on a component arranged thereon, such as for example the water collection pot 6. In the optional water collection pot 6 a water separator, in particular a so-called coalescer, is usually arranged. In addition to this, a function element 9 (see also FIG. 4) is usually inserted in the filter appliance 1 according to the invention, on which a channel 10 formed complementarily to the pin 7 and serving as pin mounting as well as a lock profile 11 fitting to the at least one key profile 8 are provided. A perfect operation of the filter appliance 1 in this case is exclusively possible provided the pin 7 engages in the channel 10 and the key profile 8 engages in the lock profile 11. Through the engaging of the pin 7 in the channel 10 the latter is closed off and because of this a pressure build-up in the filter appliance 1 is made possible in the first place. Generally, the channel 10 can be designed as an idle channel.

Figure 4:
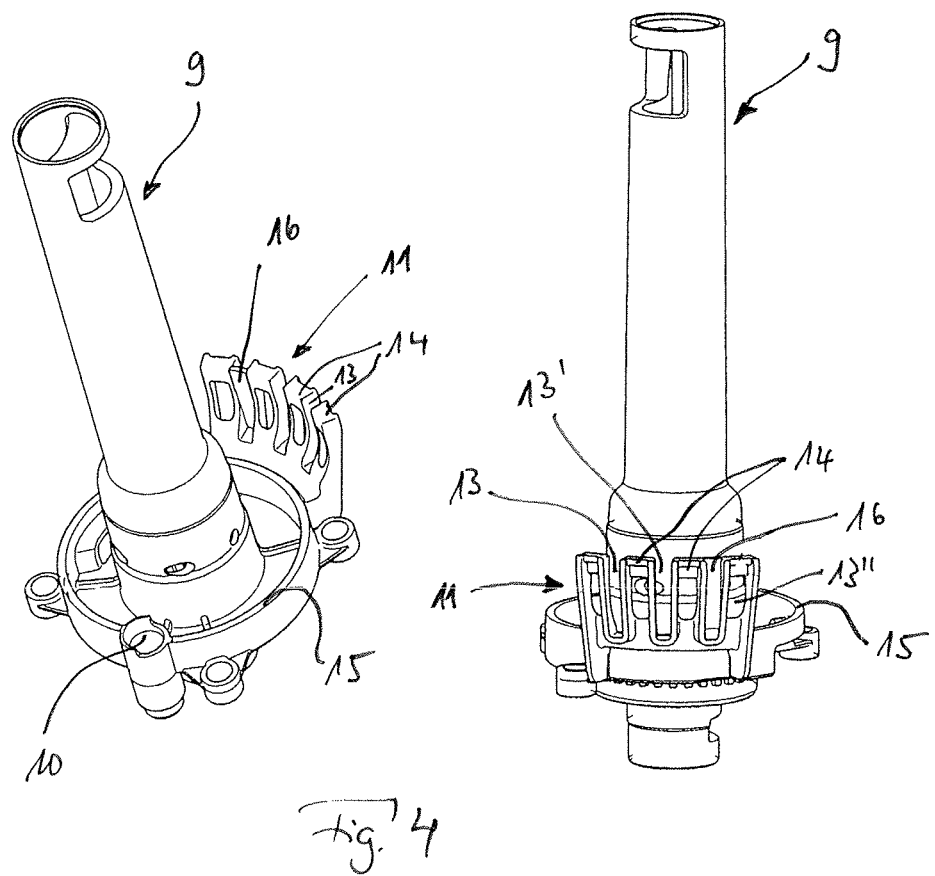

Looking at FIG. 3, in particular, it is evident that the key profile 8 comprises two noses 12 and 12', while the associated lock profile 11 according to FIG. 4 has two slits 13 and 13' fitting said noses. Obviously, merely a single nose 12 is also adequate in this case to realise the key lock principle according to the invention, which engages in a slit 13 associated with the lock profile 11. The important here is merely the circumferential orientation of the pin 7 and the at least one nose 12. In general, the lock profile 11 can be formed comb-like, such as is shown for example according to FIG. 4, wherein between individual teeth 14, abovementioned slits 13 and 13' are arranged.

In addition, a guide 15 is provided on the function element 9, on which the pin 7 is guided to the channel 10, so that upon inserting the ring filter element 3 in the filter housing 2 of the filter appliance 1, an alignment of the ring filter element 3 in its installation position takes place automatically. In the installation position, the pin 7 in this case are aligned with the associated channel 10 on the function element 9 and the noses 12, 12' with the associated slits 13, 13' on the lock profile 11.

In order to facilitate the production in particular of the ring filter element 3 and/or of the function element 9, the key profile 8 can be formed unitarily with the end disc 5 or the water collection pot 6 and the lock profile 11 unitarily with the function element 9. Since both the water collection pot 6 as well as the function element 9 are preferentially produced from plastic, the production of the key profile 8 or the lock profile 11 can be accomplished through simple injection moulding-on. Obviously, a separate embodiment is also conceivable.

In order to be able to equip different markets with the respective associated ring filter elements 3, a modular system for the filter appliance 1 can also be provided, wherein at least two function elements 9 and two associated ring filter elements 3 are provided with different key/lock profiles 8, 11 by pairs. Because of this it can be ensured that in the respective market, preferentially exclusively the associated ring filter elements 3 can be employed and because of this a high filtering performance can be achieved. To distinguish the individual function elements 9 for different markets, individual slits, according to FIG. 4 the slit 13', can be closed off by means of a suitable blocking element 16, wherein through a simple breaking-off or removing of the respective blocking element 16, but which has to be carried out expertly, the associated slit 13" is exposed. According to FIG. 4, the blocking element 16 in this case is merely arranged in the region of the slit 13" and blocks the latter, so that any nose provided for this purpose cannot be inserted and because of this the ring filter element 3 cannot be correctly inserted in the filter housing 2.

Within the water collection pot 6, a water separator, for example a coalescer, is usually arranged, wherein the water collection pot 6 can for example be welded to the lower end disc 5. Such a coalescer is able to collect water particles and thus filter out any water components that are present in the fuel, so that these cannot enter the combustion engine and cause corrosion damages there.

In addition it is provided and evident from FIGS. 1 and 2 that when the pin 7 does not engage in the channel 10 and the key profile 8 is not inserted in the fitting lock, the filter housing 2 cannot be screwed closed, because a thread 17 of the filter housing lid 16 cannot engage in a thread 18 on the filter housing pot 20. Only when the pin 7 and the key profile 8 are each inserted in their fitting mating contour, i.e. the channel 10 and the lock profile 11, will the two threads 17, 18 engage and the filter device 1 can be screwed closed. To this end, the ring filter element 3 has to be rotatably and releasably mounted on the filter housing lid 19. If a non-fitting ring filter element 3 sits in the filter housing 2, the filter appliance 1 cannot be closed, so that when the engine is switched on, sensors can measure the pressures which are not present and output an error message, for example to the driver. In the case of fuel it should obviously be preferably prevented that a motor vehicle with open filter appliance 1 is started. If required, this can be achieved through suitable devices for example sensors. For example the pin 7 and the channel 10 or the key-lock profile can include a sensor system which informs an engine electronic system if the ring filter element 3 has been installed and if it is in a functionally correct position. Such sensor systems can operate inductively or via radio, e.g. by means of RFID or read contact or Hall sensor.

Conversely, it is obviously also conceivable that the key profile 8 is arranged on the function element 9 and the lock profile 11 fitting thereto on the ring filter element 3, which in particular is arranged on its water collection pot 6.

Alternatively, the key-lock profile can also be arranged on an inaccessible inside, e.g. an inner frame of the ring filter element 3 and the fitting function element 9 or dome of the filter housing 2. In the case of an oil filter the pin 7 for example is moulded preferentially onto the lower end disc 5. On the inside of the end disc 5 or on the inner frame following on the end disc 5, protrusion can be arranged which engage in openings or depressions of the function element 9. This arrangement would have the advantage that the key-lock profiles are less susceptible to misuse. This could possibly also be realised on the inside of the water collection pot 6 of a fuel filter.

The invention claimed is:

1. A filter appliance, comprising:
a ring filter element having a longitudinal axis and arranged in a filter housing, the ring filter element having an axially upper end disc and an axially lower end disc,
a collection pot arranged on the lower end disc and defining an opening, the collection pot including an axially projecting pin and at least one key profile protruding radially, wherein the pin and the at least one key profile are circumferentially spaced from one another;
a function element having an insertable portion configured to be inserted into the opening of the collection pot and an end portion including a channel configured to receive the pin, and
a lock profile disposed on the end portion of function element, wherein the lock profile is configured to receive the at least one key profile of the collection pot,
wherein the filter appliance is operational when the pin engages in the channel and the at least key profile engages in the lock profile.

2. The filter appliance according to claim 1, wherein the at least one key profile includes at least one nose and the lock profile includes at least one slit arranged complementarily to the at least one nose.

3. The filter appliance according to claim 1, wherein the at least one key profile includes two or more noses spaced from one another in circumferential direction and the lock profile includes two or more slits formed complementarily thereto.

4. The filter appliance according to claim 3, wherein the lock profile is comb-like having individual teeth, and wherein the slits are formed between the individual teeth for receiving the noses.

5. The filter appliance according to claim 3, wherein at least one of the slits includes a removable blocking element configured to close the at least one slit and match the locking profile to the at least one key profile.

6. The filter appliance according to claim 1, wherein the filter appliance is embodied as at least one of an oil and a fuel filter.

7. The filter appliance according to claim 1, wherein the end portion of the function element further includes a circumferentially extending guide including the lock profile and the channel, and wherein the pin is rotatably guided on the guide into the channel.

8. The filter appliance according to claim 7, wherein the guide of the end portion defines an inclined ramp extending circumferentially from at least the lock profile to the channel, and wherein the pin slides along the ramp to the channel via a rotational movement.

9. The filter appliance according to claim 8, wherein the channel has an axially extended contour partially surrounding a channel inlet on a side of the channel circumferentially opposite the ramp to stop the rotational movement.

10. The filter appliance according to claim 1, wherein the at least one key profile engages in the lock profile in response to the pin engaging in the channel.

11. The filter appliance according to claim 1, wherein the pin is disposed relative to the at least one key profile axially offset and towards the end portion of the function element, and wherein the pin interacts with the end portion of the functional element to prohibit the at least one key profile from engaging with the lock profile until the pin engages in the channel.

12. A ring filter element for a filter appliance, comprising:
an annular filtering material having a first axial end and a second axial end, the filtering material surrounding an interior space defining a central axis;
a water collection pot coupled to the first axial end with a water separator arranged therein, the water collection pot having an opening arranged coaxial with the interior space with respect to the central axis;
an axially projecting pin and key profile disposed on an outer circumference of the water collection pot facing away from the central axis, wherein the pin and the at least one key profile are arranged circumferentially spaced from one another;
a carrier element including a carrier portion insertable into the interior space of the filtering material via the opening of the water collection pot and a guide disposed on an axial end portion, wherein the guide includes a channel configured to receive the pin and a lock profile configured to receive the key profile when the carrier element is in an installed position;
wherein the carrier element is in the installed position when the key profile engages in the lock profile in response to the pin engaging in the channel.

13. The ring filter element according to claim 12, wherein the key profile includes at least one radially protruding nose and the lock profile includes at least one axially extended slit formed complementarily to the at least one nose.

14. The ring filter element according to claim 13, wherein the key profile further includes at least two noses circumferentially spaced from one another and the lock profile further includes at least two slits formed complementarily thereto.

15. The ring filter element according to claim 14, wherein the lock profile is comb-like having a plurality of teeth defining the at least two slits, and wherein the at least two slits are formed between the individual teeth for receiving the at least two noses of the key profile.

16. The ring filter element according to claim 15, wherein at least one of the slits is closed off by a removable blocking element configured to match the locking profile to the at least one key profile.

17. The ring filter element according to claim 12, wherein the guide defines an inclined ramp extending circumferentially between the channel and the lock profile, and wherein the pin is slidably guided on the ramp into the channel along a rotational movement.

18. The ring filter element according to claim 17, wherein the channel has an axially extended contour partially surrounding a channel inlet on a side of the channel circumferentially opposite the ramp to stop the rotational movement.

19. The ring filter element according to claim 12, wherein the key profile is formed unitarily with the water collection pot and the lock profile is formed unitarily with the guide of the carrier element.

20. The ring filter element according to claim 12, wherein the pin is disposed relative to the key profile axially offset and interacts with the guide to prohibit the key profile from engaging with the lock profile until the pin engages in the channel.

* * * * *